United States Patent [19]

Mita et al.

[11] Patent Number: 4,628,297

[45] Date of Patent: Dec. 9, 1986

[54] CODE MODULATION SYSTEM

[75] Inventors: Seiichi Mita, Kanagawa; Morishi Izumita, Inagi; Masuo Umemoto, Tokyo; Yoshizumi Eto, Sagamihara; Morito Rokuda, Katsuta; Hidehiro Kanada, Kodaira, all of Japan

[73] Assignees: Hitachi, Ltd.; Hitachi Denshi Kabushiki Kaisha, both of Tokyo, Japan

[21] Appl. No.: 696,477

[22] Filed: Jan. 30, 1985

[30] Foreign Application Priority Data

Feb. 1, 1984 [JP] Japan .................................. 59-15228

[51] Int. Cl.$^4$ .......................... H03K 13/24; G11B 5/09
[52] U.S. Cl. .............................. 340/347 DD; 360/40
[58] Field of Search ............ 340/347 DD; 360/40-42, 360/32, 39; 358/13, 310, 327, 328; 332/9 R; 375/19, 34

[56] References Cited

U.S. PATENT DOCUMENTS 3,719,934  3/1973  Behr et al. .......................... 360/41
4,520,346  5/1985  Shimada ...................... 340/347 DD
4,523,181  6/1985  Tazaki et al. ...................... 360/40 X

OTHER PUBLICATIONS

"Recent Developments for Digital VTR: Channel Coding and Error Protection"; International Broadcasting Convention, IEEE 220, pp. 221-225, 1982, J. Heitmann et al.

Primary Examiner—Vit W. Miska
Attorney, Agent, or Firm—Antonelli, Terry & Wands

[57] ABSTRACT

In the code modulation system for converting input data levels into an output signal in the form of code words by providing M input levels among N input levels assigned to input data with stairlike code weights on the basis of the input levels, (N−M) input levels which are the difference between said N input levels and said M input levels are respectively disposed near transition points where said stairlike code weight is changed, and the code weights are provided with hysteresis in the ascent process and the descent process of the input data level.

6 Claims, 10 Drawing Figures

CODE MODULATION SYSTEM

BACKGROUND OF THE INVENTION

The present invention relates to a code modulation (channel coding) system used for recording, reproducing and transmitting digitalized video signals.

Recently, units for digitalizing video signals (television signals) and recording/reproducing the signals have been vigorously developed. This is because the picture quality can be significantly improved in such devices as compared with the conventional analog recording system.

One of the representative units for recording/reproducing such digitalized television signals is a digital VTR.

The NRZ (Non Return to Zero) system is one of the available modulation systems for recording/reproducing the video data onto/from such a digital VTR. In the NRZ system, input data "1" and "0" are made to be associated with the high level and the low level of the signal amplitude, respectively.

In the NRZ system, however, the DC component and the low frequency components included in the signal increase when the input data "1" or "0" appears consecutively or when one of the data "1" and "0" appears more frequently than the other. If such a signal is transmitted via a rotary transformer as in the VTR, the low frequency components are cut off. As a result, the waveform is significantly deteriorated by the sag in the signal level and a number of code errors are produced.

One of the modulation systems for eliminating the above described drawbacks of the NRZ system is the 8-8 conversion system. Reference may be made to "RECENT DEVELOPMENTS FOR DIGITAL VTR: CHANNEL CODING AND ERROR PROTECTION" by J. Heitmann et al, International Broadcasting Convention IEEE 220, pp. 221-225, 1982. In this system, sufficiently high correlation between video signals is utilized to eliminate the DC component and the low frequency components included in the video data. However, the 8-8 conversion system is not completely satisfactory in that the DC and low frequency components are not eliminated sufficiently.

SUMMARY OF THE INVENTION

Therefore, an object of the present invention is to provide a system which efficiently suppresses the DC component and the low frequency components included in the data irrespective of the input level situation as long as the amplitude change of the video signal lies within a certain range.

In order to achieve the above object, according to one aspect of the present invention, in the code modulation system for converting input data levels into an output signal in the form of code words by providing M input levels among N input levels assigned to input data with stairlike code weights on the basis of the input levels, (N−M) input levels which are the difference between the N input levels and the M input levels are respectively disposed near transition points where said stairlike code weight is changed, and the code weights are provided with hysteresis in the ascent process and the descent process of the input data level.

BRIEF DESCRIPTION OF THE DRAWINGS

The present invention will now be apparent from the following detailed description taken in conjunction with the accompanying drawings, in which.

DESCRIPTION OF THE 8-8 CONVERSION SYSTEM

Before going on to the detailed description of the preferred embodiments of the present invention, the 8-8 conversion system will be described hereinafter in more detail with reference to FIGS. 1 to 4.

Figures 1, 2:
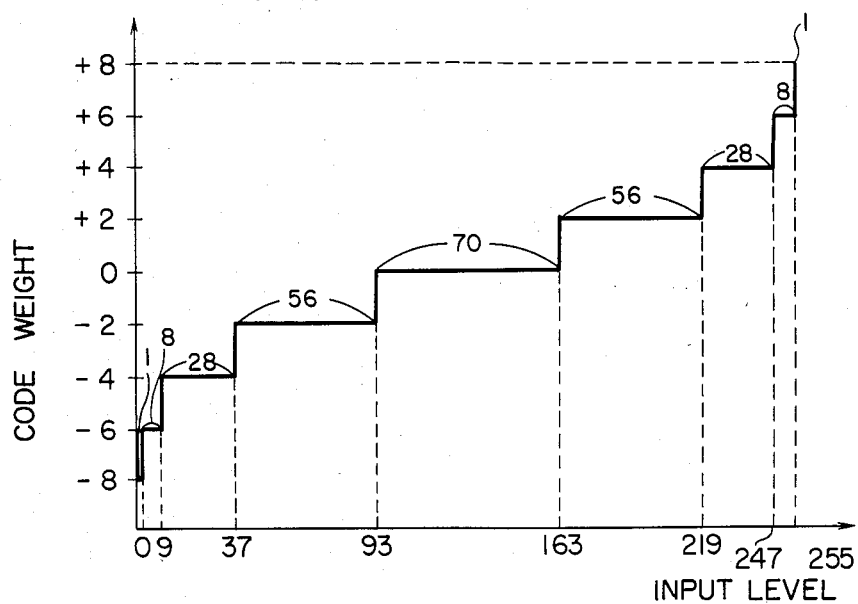
FIG. 1 is a drawing for illustrating the 8-8 conversion system.
FIG. 2 shows the weight distribution of 8-bit data.

In FIG. 1, the abscissa represents the input level (of the video data) and the ordinate represents the code weight. The illustrated stairlike solid lines are defined by the relationship between the code weight and the number of data levels as illustrated in FIG. 2. That is to say, the number of levels is one for the code weight +8, eight for the code weight +6, twenty-eight for the code weight +4, fifty-six for the code weight +2, seventy for the code weight 0, fifty-six for the code weight −2, twenty-eight for the code weight −4, eight for the code weight −6, and one for the code weight −8. Therefore, the code weight is −8 for the input level 0, −6 for the input level 1 to 9, −4 for the input level 10 to 37, −2 for the input level 38 to 93, 0 for the input level 94 to 163, +2 for the input level 164 to 219, +4 for the input level 220 to 247, +6 for the input level 248 to 255, and +8 for the input level 256.

If the sampling frequency is sufficiently higher than (typically three times or more as large as) the bandwidth of the video signal and pictures correlate with each other, the amplitude change between two sampling points adjacent to each other is small. After the 8-8 conversion, therefore, the difference between data code weights at two sampling points adjoining each other is zero or very small. If the data polarity is inverted from one sample to the next, therefore, the code weight becomes zero or very small for every other word (assuming that one word consists of 8-bit data at one sampling point). The DC component and low frequency components are thus eliminated or suppressed.

Figure 3:
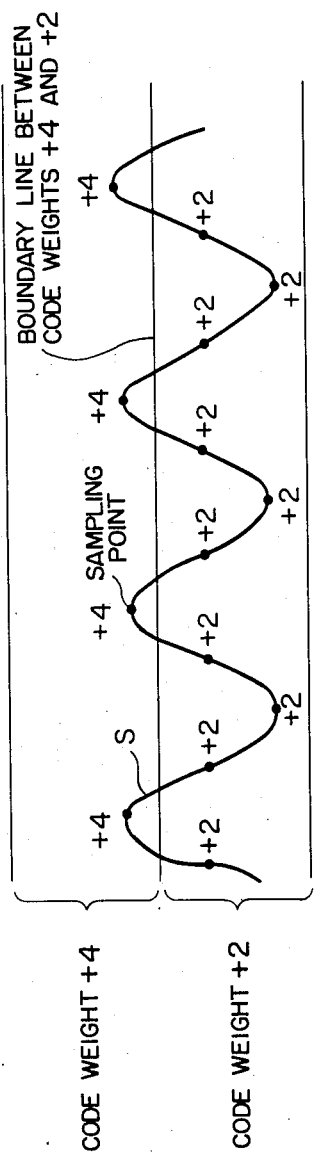
FIGS. 3 and 4 show how the weight distribution changes in the 8-8 conversion of sine wave video signals.

However, since the DC component and the low frequency components included in the data after the 8-8 conversion depend upon correlation between picture signals, it is a matter of course that the DC component appears for some patterns. For example, the DC component appears when the pattern includes a high frequency component. As one example, FIG. 3 shows input data having a frequency which equals a quarter of the sampling frequency and stretching over code weights +2 and +4. The code weights immediately after the 8-8 conversion are distributed as +2, +4, +2, +2, +2, +4, +2, +2, and so on from the leftmost point in FIG. 3. If the code weights are inverted every other word, the code sequence becomes +2, −4, +2, −2, +2, −4, +2, −2, and so on. That is to say, the code weight is shifted by −2 every cycle of the input data. Since the number of codes for one cycle is 32 bits, the DC component of approximately 6% is generated as seen from the computation (2÷32)×100.

Figure 4:
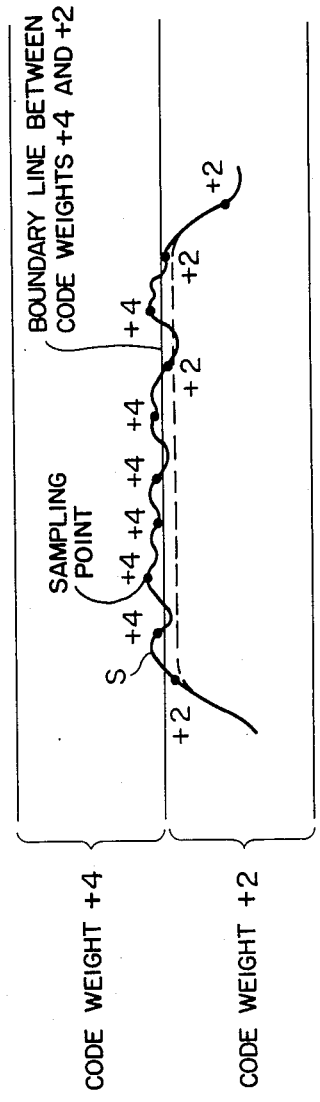

Another example is illustrated in FIG. 4. In many portions of a video signal, the amplitude level is generally constant (flat) as represented by a broken line of FIG. 4. If noises as represented by solid lines of FIG. 4 are superimposed over the nearly flat portion, code weights +2 and +4 appear at random at sampling points where the code weight should become +2. In some portions of the data, therefore, the code weights exhibit significantly unbalanced distribution. Such a situation is further expanded as the S/N of the video signal is lowered. That is to say, a similar situation is incurred at input levels situated around the input level where the code weight changes. Such a phenomenon frequently appears not only when the S/N is lowered but also when the pattern is fine and has a low contrast.

DETAILED DESCRIPTION OF THE PREFERRED EMBODIMENT

The principle of the data conversion of the present invention will be explained with reference to FIGS. 5A to 5C and 6. In each of these figures, the abscissa represents the input level and the ordinate represents the code weight.

Figure 5A:
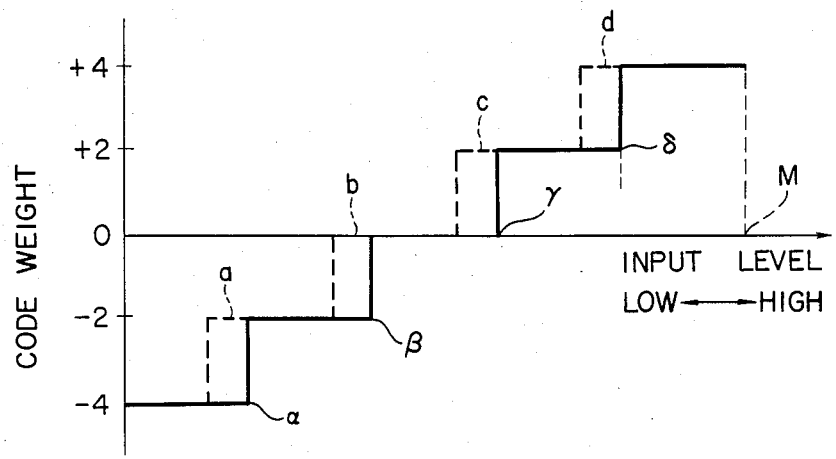
FIGS. 5A to 5C and 6 show data conversion in the present invention system.
Figure 5B:
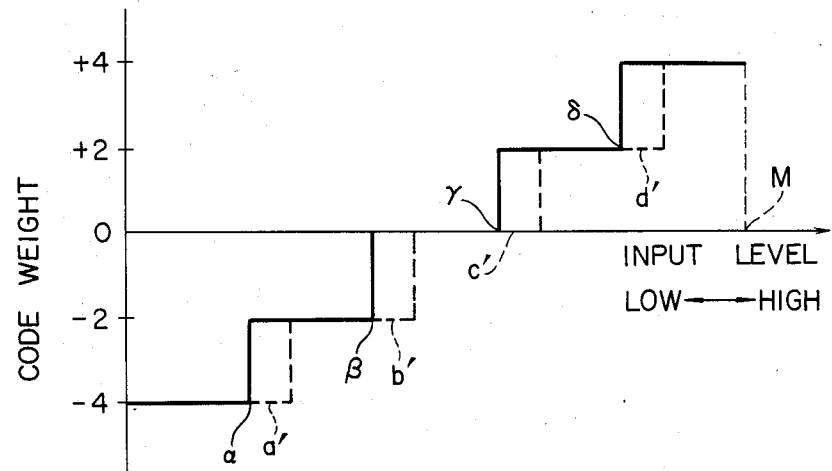
Figure 5C:
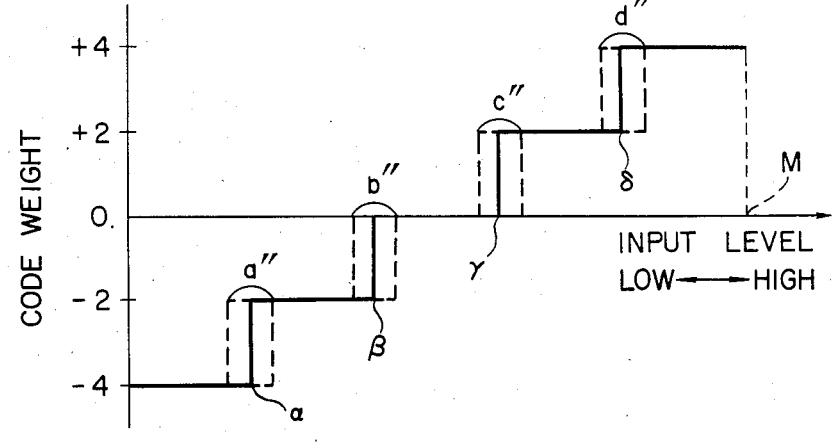

As shown in FIGS. 5A to 5C, in the code modulation system in accordance with the present invention, stairlike code weights are given to M input levels assigned to input data on the basis of the data level. (N−M) input levels which are the difference between the N total input levels and M input levels thereof assigned to input data are respectively disposed in the vicinity of transition points $\alpha$, $\beta$, $\gamma$ and $\delta$, where the stairlike code weight is changed, as represented by a, b, c and d (a', b', c' and d'; a", b", c" and d"). And the code weight change in the ascent process and/or the descent process of the input data level is effected through the above described regions a, b, c or d. In the example of FIG. 5A, each of (N−M) input levels is disposed on the lower level side with respect to each transition point where the code weight is changed. In the example of FIG. 5B, each of (N−M) input levels is disposed on the higher level side with respect to each transition point. In the example of FIG. 5C, each of (N−M) input levels is disposed on both the lower level side and the higher level side with respect to each transition point. The principle of the data conversion of the present invention will now be described more concretely.

If a video signal is quantized with 8 bits, 256 levels are obtained. As a matter of fact, the picture quality is not worsened even if approximately 200 levels are assigned to the video signal. Therefore, it is now assumed that 200 levels have been assigned to the video signal. In accordance with the present invention, a margin of 56 levels obtained as the difference between 256 levels and 200 levels is used to suppress the occurrence of the DC component at the transition point of the code weight distribution in the above described 8-8 conversion. As occasion demands, the number of margin levels can be changed according to the adopted kind of the code weight. It is now assumed that 200 levels assigned to the video signal are subjected to the 8-8 conversion by using only five kinds of code weights +4, +2, 0, −2 and −4, for example. In this case, the total number of input levels is 238 as shown in FIG. 2. A margin K of 38 levels is obtained as the difference between 238 levels and 200 levels.

Figure 6:
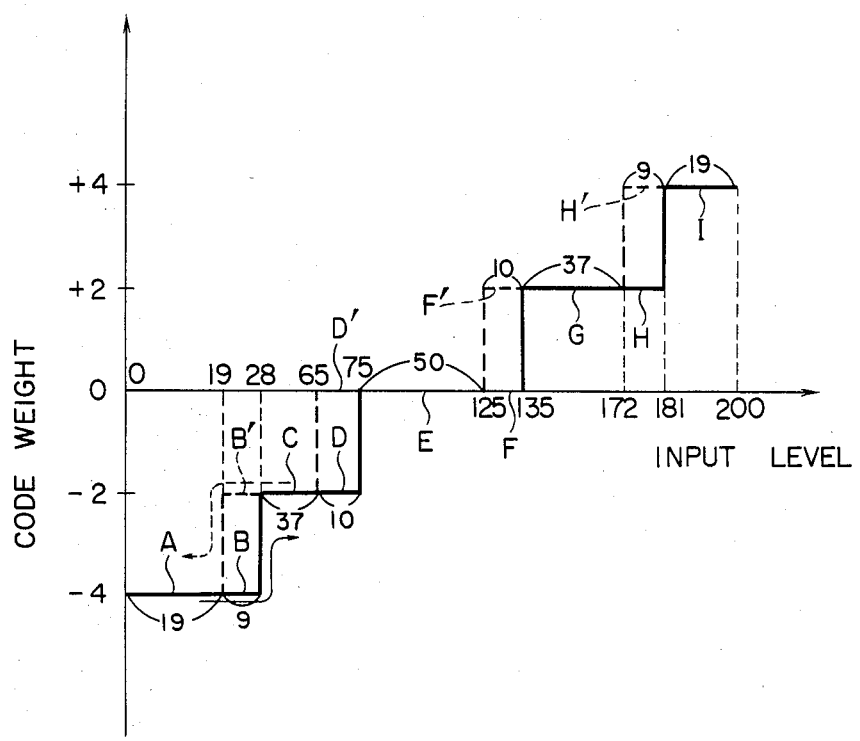

The margin of 38 levels is effectively used. That is to say, two kinds of patterns having different code weights are made to be associated with each of the levels located in the vicinity of input levels 28, 75, 135 and 181 where the code weight changes. These two kinds of patterns are selected along the hysteresis characteristics as shown in FIG. 6. That is to say, when the input level is raised, the code weight increases along a path represented as A→B→C→D→E→F→G→H→I. When the input level is lowered, the code weight decreases along a path represented as I→H'→G→F'→E→D'→C→B'→A.

For example, when the input level changes as 10→20→30→20→10, the resultant path of FIG. 6 is represented as A→B→C→B'→A. That is to say, even if a drop of 9 levels is incurred at the code weight −2, the code weight change is not produced in the data after conversion due to the presence of the region B'. This means that the complete DC balance can be obtained for any data taking two words as the unit provided that the level drop caused by the noise or pattern does not exceed 9 levels.

Figure 7:
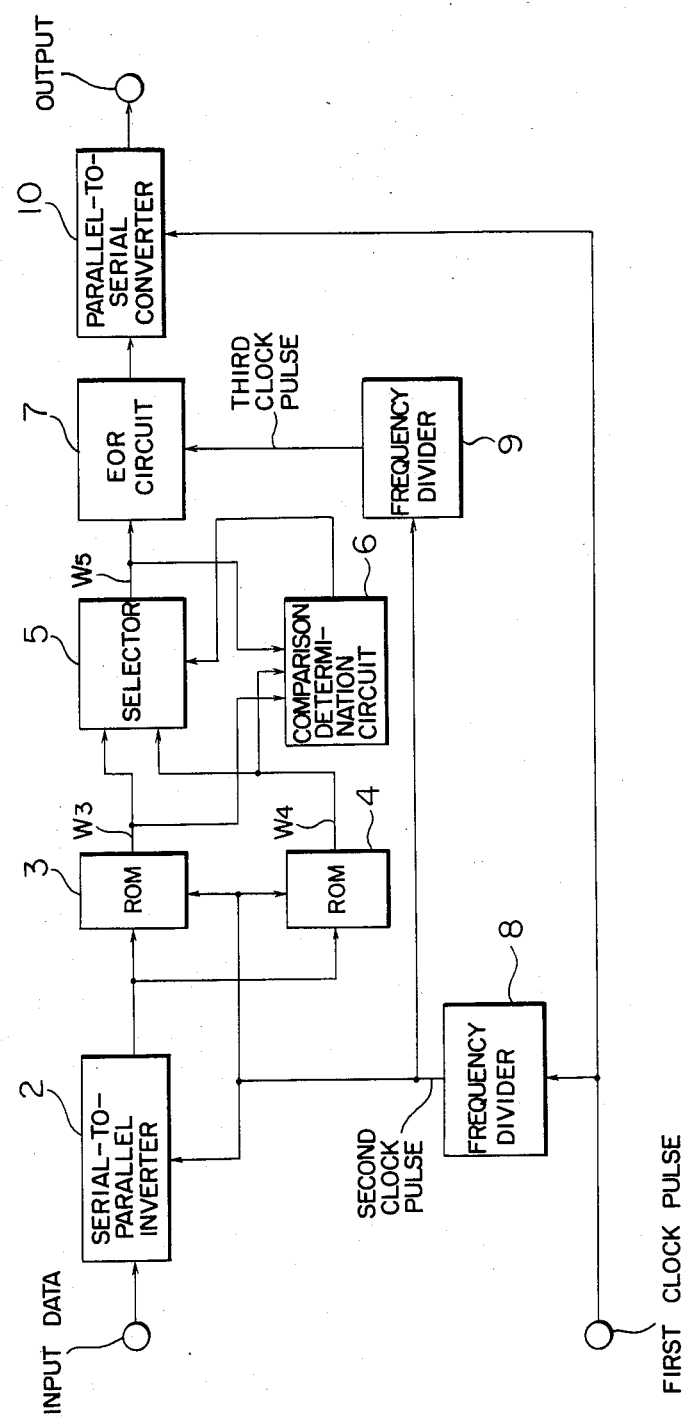
FIG. 7 is a block diagram for illustrating an example of practical configuration of the present invention system.

FIG. 7 shows one embodiment of the present invention.

At first, the input data (video data) is converted into 8-bit parallel data by a serial-to-parallel converter 2 to be applied to read-only memories ROM 3 and ROM 4. The ROM 3 determines which of the portions A, B, C, D, E, F, G, H and I illustrated in FIG. 6 the input level of each input data belongs to and sends out the corresponding code weight. In the same way, the ROM 4 determines which of A, B', C, D', E, F', G, H' and I illustrated in FIG. 6 the input level of each input data belongs to and sends out the corresponding code weight. A selector 5 selects either the output of the ROM 3 or the output of the ROM 4 in accordance with the command fed from a comparison determination circuit 6 and sends out the output thus selected. The comparison determination circuit 6 receives outputs of the ROM 3 and the ROM 4 and sends a command for selecting either the output of the ROM 3 or the output of the ROM 4 to the selector 5 in accordance with predetermined determination criteria which will be described later. An exclusive-OR circuit 7 inverts the output of the selector circuit 5 for every other word. A parallel-to-serial converter 10 converts the parallel data fed from the exclusive-OR circuit 7 into serial data to send the data out. This parallel-to-serial converter 10 is driven by the first clock pulse as shown in FIG. 7. A frequency divider 8 applies frequency division of ⅛ to the first clock pulse and supplies the resultant second clock pulse to the serial-to-parallel converter 2, the ROM 3 and the ROM 4. A frequency divider 9 applies frequency division of ½ to the second clock pulse and supplies the resultant third clock pulse to the exclusive-OR circuit 7. It can be easily conducted to reconvert the output of the parallel-to-serial converter 10 to the original video data by uniquely determining the correspondence of the output data of the converter 10 to the original video data.

How the selection command of the comparison determination circuit 6 is issued will now be described. Outputs of the selector 5, the ROM 3, and the ROM 4 at the time n are code weights $W_5(n)$, $W_3(n)$ and $W_4(n)$, respectively. The comparison determination circuit 6 issues the command for selecting the output $W_3(n)$ of the ROM 3 to the selector 5, if $$\begin{cases} W_3(n) = W_5(n-1) \\ W_4(n) \neq W_5(n-1) \end{cases} \quad (1)$$

or $$W_4(n) > W_3(n) > W_5(n-1). \quad (2)$$

Figure 8:
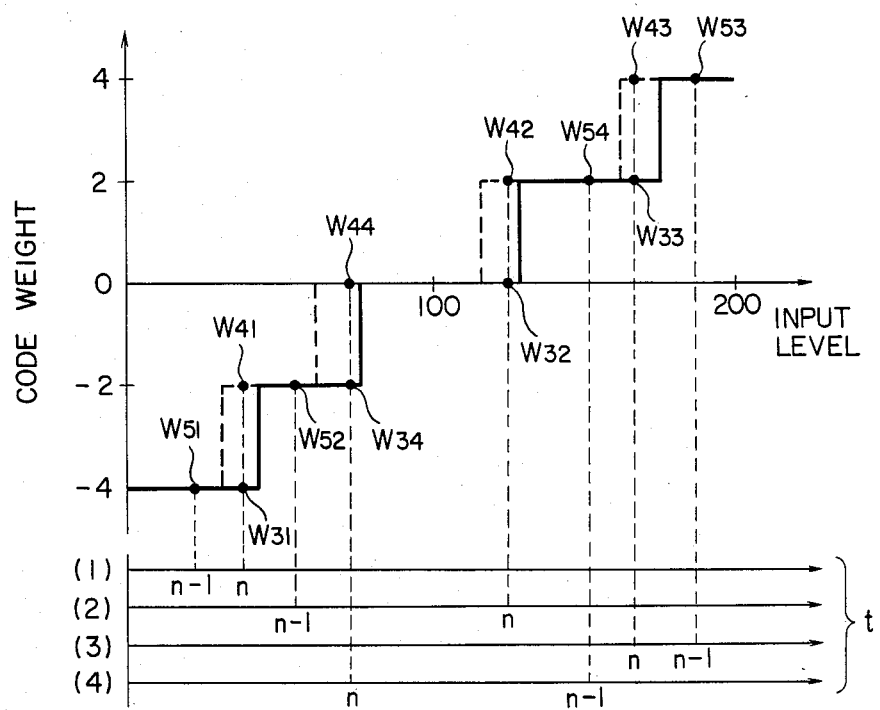
FIG. 8 shows how selection commands from a comparison decision circuit 6 are issued.

An example of a case satisfying the expressions (1) and (2) will now be described by referring to FIG. 8. When the output of the selector 5 at the time $(n-1)$, the output of the ROM 3 at the time n, and the output of the ROM 4 at the time n are respectively $W_{51}$, $W_{31}$, and $W_{41}$, $W_{31}=W_{51}$ and $W_{41}\neq W_{51}$ hold true. Since the expression (1) is satisfied, the output $W_{31}$ of the ROM 3 is selected. When the output of the selector 5 at the time $(n-1)$, the output of the ROM 3 at the time n, and the output of the ROM 4 at the time n are respectively $W_{52}$, $W_{32}$, and $W_{42}$, the relation $W_{42} > W_{32} > W_{52}$ holds true. Since the expression (2) is satisfied, the output $W_{32}$ of the ROM 3 is selected.

The comparison determination circuit 6 issues the command for selecting the output $W_4(n)$ of the ROM 4 to the selector 5, if $$\begin{cases} W_3(n) \neq W_5(n-1) \\ W_4(n) = W_5(n-1) \end{cases} \quad (3)$$

or $$W_5(n-1) > W_4(n) > W_3(n). \quad (4)$$

An example of a case satisfying the expressions (3) and (4) will now be described by referring to FIG. 8. When the output of the selector 5 at the time $(n-1)$, the output of the ROM 3 at the time n, and the output of the ROM 4 at the time n are respectively $W_{53}$, $W_{33}$ and $W_{43}$, $W_{33}\neq W_{53}$ and $W_{43}=W_{53}$. Since the expression (3) is satisfied, the output $W_{43}$ of the ROM 4 is selected. When the output of the selector 5 at the time $(n-1)$, the output of the ROM 3 at the time n, and the output of the ROM 4 at the time n are respectively $W_{54}$, $W_{34}$, and $W_{44}$, it follows that $W_{54} > W_{44} > W_{34}$. Since the expression (4) is satisfied, the output $W_{44}$ of the ROM 4 is selected.

Although not illustrated, either the output $W_3$ of the ROM 3 or the output $W_4$ of the ROM 4 may be selected, if $$W_4(n) = W_3(n) > W_5(n-1) \quad (5)$$

or $$W_5(n-1) > W_4(n) = W_3(n). \quad (6)$$

In applying the 8-8 conversion to the input data (video data), two kinds of patterns are thus assigned to data located in the vicinity of the input level where the code weight changes and are selected along the hysteresis characteristics. Thereby, the DC component can be completely eliminated provided that the amplitude change of the video signal is below a certain value. Thus, it becomes possible to eliminate the greatest drawback of the 8-8 conversion system. Further, it is possible to maintain the DC suppression effect of the 8-8 conversion for a video signal having a low S/N as well, resulting in its wider application.

We claim:

1. A code modulation apparatus for converting input data levels into an output signal in the form of code words, comprising:

a first ROM and a second ROM for respectively providing predetermined code weights in the form of code words, said code weights changing in level in accordance with changes in the input data level along a stairlike characteristic, a code weight provided by said first ROM for an input data level in the vicinity of a transition point in the changes in level of the stairlike characteristic being different from that provided by said second ROM for the same input data level;

a selector for selecting either the output of said first ROM or the output of said second ROM and sending out the output thus selected;

a comparison determination circuit for receiving the output of said first ROM and the output of said second ROM and for sending a selection command to said selector in accordance with predetermined determination criteria, said selector selecting either the output of said first ROM or that of said second ROM as an output thereof on the basis of said selection command, in accordance with said predetermined determination criteria, the output of said first ROM being selected for changes in the increasing direction of said input data level and the output of said second ROM being selected for changes in the decreasing direction of said input data level; and an exclusive-OR circuit for inverting the output of said selector for every other code word and sending out the inverted and non-inverted code words as said output signal.

2. A code modulation apparatus according to claim 1, wherein, assuming that the output of said selector at the time n, the output of said first ROM at the time n, and the output of said second ROM at the time n are code words whose code weights are $W_5(n)$, $W_3(n)$ and $W_4(n)$, respectively in accordance with said determination criteria of said comparison determination circuit;

a command for selecting the output $W_3(n)$ of said first ROM is issued when $$\begin{cases} W_3(n) = W_5(n-1) \\ W_4(n) \neq W_5(n-1) \end{cases}$$

or $$W_4(n) > W_3(n) > W_5(n-1);$$

a command for selecting the output $W_4(n)$ of said second ROM is issued when $$\begin{cases} W_3(n) \neq W_5(n-1) \\ W_4(n) = W_5(n-1) \end{cases}$$

or $$W_5(n-1) > W_4(n) > W_3(n);$$

and a command for selecting the output $W_3(n)$ of said first ROM or the output $W_4(n)$ of said second ROM is issued when $$W_4(n) = W_3(n) > W_5(n-1) \tag{5}$$

or $$W_5(n-1) > W_4(n) = W_3(n).$$

3. A code modulation apparatus for converting an input signal in the form of a train of quantized levels into an output signal in the form of a train of 1-word-n-bit code words, comprising:

means connected to receive said input signal in the form of a train of quantized levels, for converting said input signal into a train of code words as an output therefrom on the basis of a predetermined conversion table, said conversion table including first and second tables, said first table being such that M code words among $2^n$ code words are arranged in order of code weight and that each of said M code words is assigned to a different one of M quantized levels arranged in order of level with $(2^n - M)$ code words left unassigned, said unassigned $(2^n - M)$ code words including a desired number K of code words set aside from at least one group of code words included in said $2^n$ code words and having certain one and the same code weight, said second table being substantially identical to said first table except that K code words in said first table assigned to K quantized levels located in the vicinity of at least one of two transition points at which said certain one and the same code weight in said first table changes to adjacent code weights are replaced by said K code words which are set aside from said at least one group, each of said K set code words being assigned to a different one of said K quantized levels;

means connected to receive the output of said converting means, for selecting said first table or said second table on the basis of a predetermined criteria, said criteria being such that when an input quantized level corresponding to one of said K quantized levels is inputted, one of said first and second tables which provides a code word whose code weight is equal to close to that of a code word corresponding to a next previous input quantized level is selected, and when an input quantized level is one other than anyone of said K quantized levels, either one of said first and second tables is selected; and means connected to an output of said selecting means, for performing an inversion operation on every other code word outputted from said selecting means to thereby produce said train of 1-word-n-bit code words which comprise a repetition of alternately disposed non-inverted and inverted code words.

4. A code modulation apparatus according to claim 3, wherein each of said K code words set aside from said one group of code words is assigned to a different one of K quantized levels located in the vicinity of that one of said two transition points which is located at a higher quantized level side as compared with the other one of said two transition points.

5. A code modulation apparatus according to claim 3, wherein each of said K code words set aside from said one group of code words is assigned to a different one of K quantized levels located in the vicinity of that one of said two transition points which is located at a lower quantized level side as compared with the other one of said two transition points.

6. A code modulation apparatus according to claim 3, wherein each of said K code words set aside from said one group of code words is assigned to a different one of K quantized levels a part of which is located in the vicinity of that one of said two transition points which is located at a higher quantized level side and the remaining part of which is located in the vicinity of the other transition point located at a lower quantized level side.

* * * * *